United States Patent [19]

Saito

[11] Patent Number: 4,950,876
[45] Date of Patent: Aug. 21, 1990

[54] OPTICAL CARD RECORDING/REPRODUCING APPARATUS WITH COMPENSATION FOR DISPLACEMENT DEVIATION BETWEEN DATA AREA OF OPTICAL CARD AND LASER BEAM

[75] Inventor: Akito Saito, Tokyo, Japan

[73] Assignee: Olympus Optical Co., Ltd., Tokyo, Japan

[21] Appl. No.: 224,051

[22] Filed: Jul. 25, 1988

[30] Foreign Application Priority Data

Jul. 31, 1987 [JP] Japan ................. 62-192411

[51] Int. Cl.$^5$ ............ G06K 13/067; G06K 7/10
[52] U.S. Cl. ................... 235/476; 235/454; 235/479; 235/480
[58] Field of Search ............ 235/436, 454, 475, 476, 235/477, 479, 480; 369/47, 48, 52, 54, 56, 58; 360/2

[56] References Cited

U.S. PATENT DOCUMENTS

| 3,706,860 | 12/1972 | Burbank ............... 235/480 |
| 3,836,753 | 9/1974 | Pass ................... 235/475 |
| 3,852,573 | 12/1974 | Dolch .................. 235/487 |
| 3,921,969 | 11/1975 | Hickey et al. ......... 235/479 |
| 3,946,205 | 3/1976 | Melugin et al. ........ 235/476 |
| 4,544,835 | 10/1985 | Drexler ............... 235/487 |
| 4,556,966 | 12/1985 | Bricot et al. ......... 369/52 |
| 4,800,258 | 1/1989 | Suzuki et al. ......... 235/475 |
| 4,833,548 | 5/1989 | Watanabe .............. 369/54 |

FOREIGN PATENT DOCUMENTS

| 0200434 | 12/1986 | European Pat. Off. |
| 0203788 | 12/1986 | European Pat. Off. |
| 2575578 | 7/1986 | France |
| 58-195982 | 11/1983 | Japan |
| 61-48135 | 3/1986 | Japan |
| 61-142533 | 6/1986 | Japan |
| 61-280073 | 12/1986 | Japan |
| 63-37876 | 2/1988 | Japan |
| 2156978A | 10/1985 | United Kingdom |
| 2174531A | 11/1986 | United Kingdom |

Primary Examiner—Alan Faber
Assistant Examiner—Robert A. Weinhardt
Attorney, Agent, or Firm—Frishauf, Holtz, Goodman & Woodward

[57] ABSTRACT

An optical card recording/reproducing apparatus comprises a fixed optical head for scanning the surface of the card with a light beam, a shuttle for holding an optical card, and a motor for moving the shuttle with respect to the optical head. The moving position of the shuttle is detected by a rotary encoder coupled to the motor. The detection output of the encoder provides data which represents the relative positional relationship between the shuttle and the optical head and is used to control the moving speed of the shuttle in such a way that a data area on the optical card is scanned by the light beam at a constant speed. The state in which the optical card is loaded in the shuttle can also be detected, and this detection output is used to compensate for the detection result of the rotary encoder. As a result, the moving speed of the shuttle can be controlled in accordance with the relative positional relationship between the optical head and the optical card.

7 Claims, 6 Drawing Sheets

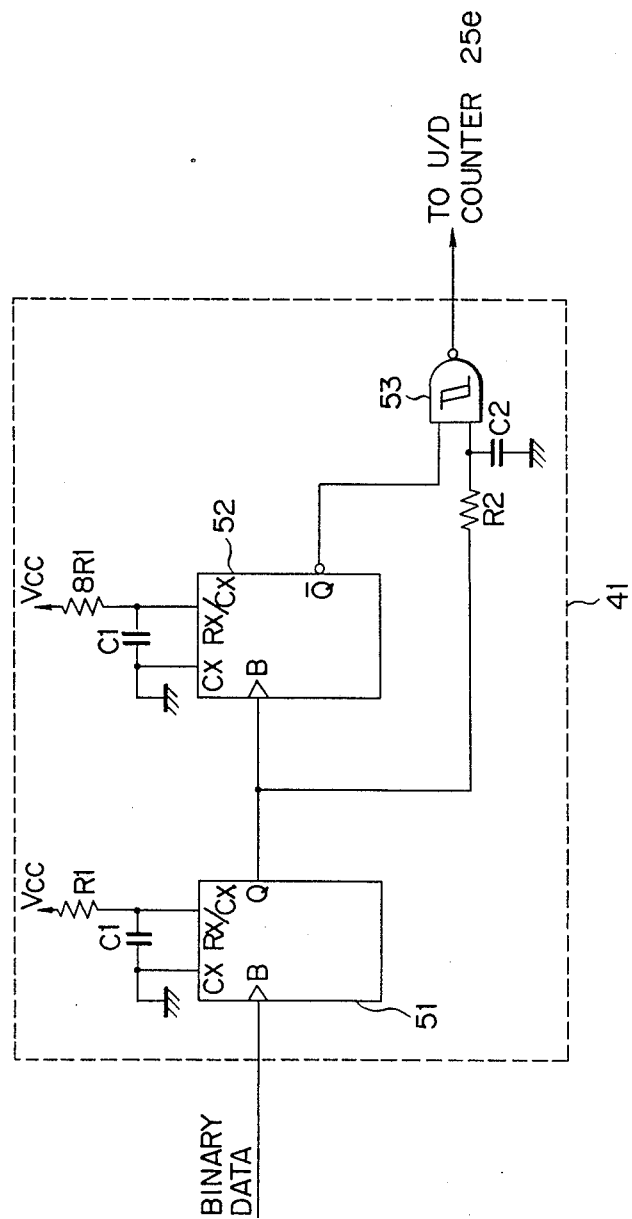
F I G. 5

OPTICAL CARD RECORDING/REPRODUCING APPARATUS WITH COMPENSATION FOR DISPLACEMENT DEVIATION BETWEEN DATA AREA OF OPTICAL CARD AND LASER BEAM

BACKGROUND OF THE INVENTION

1. Field of the Invention

The present invention relates to an optical card recording/reproducing apparatus which accesses an optical card having an optical data recording section, for data recording into and/or data readout from the card.

2. Description of the Related Art

Although, like an optical disk, such an optical card is not rewritable, it has as a large memory capacity as, for example, 1 to 2 MB, which is several thousands to a million times greater than that of a magnetic card. Therefore, optical cards have wide applications, such as for bankbooks, portable maps and prepaid cards for use in shopping.

A recording/reproducing apparatus for accessing such optical cards is disclosed in Japanese Patent Application No. 61-178876 (corresponding to Japanese Patent Disclosure No. 63-37876), assigned to the same assignee as the present invention.

FIG. 1 is a plan view illustrating an optical card for use in the above apparatus. An optical card 11 has its one surface provided with an optical data recording section 13, which is divided into a plurality of parallel tracks 12 in the lengthwise direction of the card. Movement of optical card 11 with respect to a fixed optical head or movement of a movable optical head with respect to optical card 11 when it is of a fixed type causes tracks 12 to be scanned with a laser beam for data recording/reproducing.

Each track 12 has its center portion serving as a data section 15, and two identifier (ID) sections 14a and 14b, on which the address of the track is recorded, are provided adjacent to both ends of the data section 15, respectively. These ID sections 14a and 14b permit address readout in both lateral movements of card 11 with respect to the optical head. In order to prevent an error in data readout due to a scratch, stain or the like at the edge portions of optical card 11 and sufficiently stabilize the moving speed of the card 11 with respect to the optical head, ID sections 14a and 14b are located at a given distance from the card's edge portions.

FIG. 2 is a block diagram of an apparatus for recording/reproducing data using the optical card disclosed in the aforementioned Japanese Patent Disclosure No. 63-37876. According to this apparatus, a fixed optical head 21 scans a track with a laser beam while moving optical card 11 in the track direction so as to access data section 15 for data recording/reproducing. When the recording/reproducing of one track is completed, optical head 21 moves in the direction perpendicular to the tracks to be ready for recording/reproducing of the next track.

A shuttle 24 is provided at a predetermined location on an endless conveyor belt 23 stretched over pulleys 22a and 22b. Optical card 11 is loaded in shuttle 24 with the card's lengthwise direction coinciding with the moving direction of the shuttle 24.

Accordingly, when conveyor belt 23 is driven, optical card 11 is moved in its lengthwise direction. The belt 23 is driven by a motor 26 coupled to pulley 22a. When shuttle 24 is conveyed by a distance corresponding to the length of the card, motor 26 is rotated in the reverse direction.

Motor 26 is provided with a rotary encoder 27 for detecting the amount and direction of its rotation, and the detection signal from this rotary encoder 27 is fed back to a motor-servo circuit 26.

Optical head 21, which is located at a predetermined location above the path of shuttle 24 conveyed by belt 23, comprises a laser diode 21a, a half prism 21b, a detector 21c, an objective 21d and a lens actuator 21e. A laser beam from laser diode 21a is irradiated onto optical card 11 loaded in shuttle 24, through half prism 21b and objective 21d. Therefore, optical card 11 loaded in shuttle 24 is reciprocated about the laser beam irradiation point. The laser beam reflected at optical card 11 has the direction of its optical path changed 90° by half prism 21b and enters detector 21c.

The output of detector 21c is supplied through a demodulator 29 to a controller 28 as reproduction data. Recorded data is modulated in a predetermined system using a self clock, and the demodulation system of demodulator 29 is associated with the modulation system.

The output of detector 21c is also supplied to focus/track-servo circuit 30, which drives lens actuator 21e in accordance with a command from controller 28 to control the focusing and tracking of objective 21d so that a laser beam is irradiated on the optical card always in a focused state.

Controller 28 controls laser diode 21a through a laser driver 31 to emit a laser beam whose intensity is modulated according to the level, "0" or "1," of recording data at the time of data recording and emit a laser beam with a constant level (normally, "0" level in the data recording) at the time of data reproducing. Controller 28 also controls motor-servo circuit 25, demodulator 29 and focus/track-servo circuit 30 to seek a desired track based on the track data demodulated by demodulator 29.

In response to a command from controller 28, motor servo circuit 25 controls motor 26 based on the detection signal from rotary encoder 27 so that ID sections 14a and 14b and data section 15 of optical card 11 pass the beam irradiation point at a constant speed. This constant speed with respect to the laser beam at the time of data recording/reproducing is required due to the employment of the modulation system using the self clock.

FIG. 3 is a block diagram illustrating the arrangement of a motor-servo circuit 25. This motor-servo circuit 25 comprises a read only memory (ROM) 25a, a digital to analog (D/A) converter 25b a power amplifier 25c, a direction discriminator 25d, an up/down counter 25e, a frequency to voltage (F/V) converter 25f and a subtractor 25g.

ROM 25a has addresses which correspond to the individual points within the reciprocating range of card 11, and has target data of the conveying speed of shuttle 24 at those points stored at the respective addresses. Shuttle 24, before the start of the operation, is secured to its initial position, for example, one edge of shuttle 24 is at the beam irradiation point. Therefore, ROM 25a contains data which gradually accelerates shuttle 24 as the shuttle moves, sets shuttle 24 at a constant speed when the head of ID section 14a reaches the beam irradiation point, and gradually decelerates shuttle 24 when the end of ID section 14b passes the beam irradiation point.

When control signals, such as a drive direction signal DIRC and drive signal DRIV, from controller 28 are supplied to ROM 25a, the address corresponding to the aforementioned initial position is set in ROM 25a.

The speed target data read out from ROM 25a is supplied to motor 26 through D/A converter 25b, subtractor 25g and power amplifier 25c. Subtractor 25g is also supplied with a signal from rotary encoder 27 in order to provide a feedback control to set the rotational speed of motor 26 at the target level.

The output of D/A converter 25b is supplied to a +terminal of subtractor 25g. Rotary encoder 27, which is coupled directly to the shaft of motor 26, outputs a phase A pulse signal and a phase B pulse signal, the order in which these pulses are generated is reversed depending on the rotational directions of motor 26 and which are supplied to direction discriminator 25d. Based on which one of the phases of the phase A and phase B signals is leading, direction discriminator 25d discriminates the moving direction of shuttle 24.

Direction discriminator 25d affixes a plus or minus signal in accordance with the discriminated shuttle moving direction to either one of the phase A and B signals, and sends the resultant signal to F/V converter 25f where it is converted to a voltage signal corresponding to the conveying speed with the direction considered. This voltage signal is then supplied to − terminal of subtractor 25g.

Direction discriminator sends the above-mentioned one of the phase A and B signals to an up count terminal or a down count terminal of up/down counter 25e in accordance with the discriminated shuttle moving direction. Consequently, the count value of up/down counter 25e is increased or decreased by the amount corresponding to the amount of rotation of motor 26. Accordingly, the address of ROM 25a is updated to be always correspond to the current position of shuttle 24 as measured from the initial position.

With the above design, shuttle 24 is gradually accelerated from the initial position, and is moved at a constant speed from the point where the head of ID section 14a reaches the beam irradiation point to a point where the end of ID section 14b passes the beam irradiation point, and is thereafter gradually decelerated to stop moving when it reaches pulley 22b.

In the above recording/reproducing apparatus, when the modulation system at the time of recording uses a self clock, for example, in the case of the modified frequency modulation (MFM) system or 2-7 modulation system, the relative moving speed of the optical card and the laser beam should be constant between ID sections 14a and 14b.

With the above arrangement, however, optical card 11 reciprocates in a state loaded in shuttle 24 secured to conveyor belt 23, so that rotary encoder 27 detects the positional relationship between shuttle 24 and optical head 21, not the positional relationship between optical card 11 and optical head 21.

Since motor 26 is controlled based on the position of shuttle 24, if the position of optical card 11, when loaded in shuttle 24, is shifted in the track direction, or the position of ID sections 14a and 14b in card 11 is shifted due to the error in manufacturing, parts of ID sections 14a and 14b, and data section 15 at the worst, become the acceleration and deceleration regions, thus resulting in inaccurate data recording/reproducing/

A conventional solution to this problem is to provide a greater constant moving range (distance) for shuttle 24 in order to allow for the deviation of optical card 11 which may be caused when it is loaded in the shuttle or when it is manufactured.

However, this measure needs a longer time for reciprocating the shuttle 24, thus lengthening the access time.

SUMMARY OF THE INVENTION

It is an object of this invention to provide an accurate and high speed data recording/reproducing in an optical card recording/reproducing apparatus, which moves a shuttle in which an optical card is loaded and an optical head for emitting a laser beam in relative to each other to scan tracks on the card with the laser beam for data recording on or data readout from a target track.

The optical card recording/reproducing apparatus according to this invention comprises a holding section for receiving an optical card, an optical head for emitting a light beam, a motor for moving the holding section and the optical head in relative to each other, a data-area detector for detecting a positional relationship between the data area of the optical card and the holding section, and a motor-servo circuit for controlling driving of the motor based on a detection result attained by the data-area detector to thereby control a relative moving speed of the holding section and the optical head.

BRIEF DESCRIPTION OF THE DRAWINGS

FIG. 5 is a detailed block diagram of a data-area detector shown in FIG. 4; and

DETAILED DESCRIPTION OF THE PREFERRED EMBODIMENT

Figure 1:
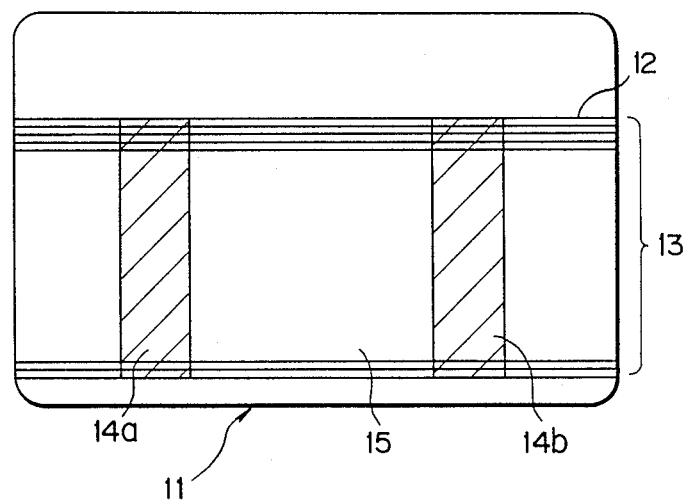
FIG. 1 is a plan view of a typical prior art optical card.
Figure 2:
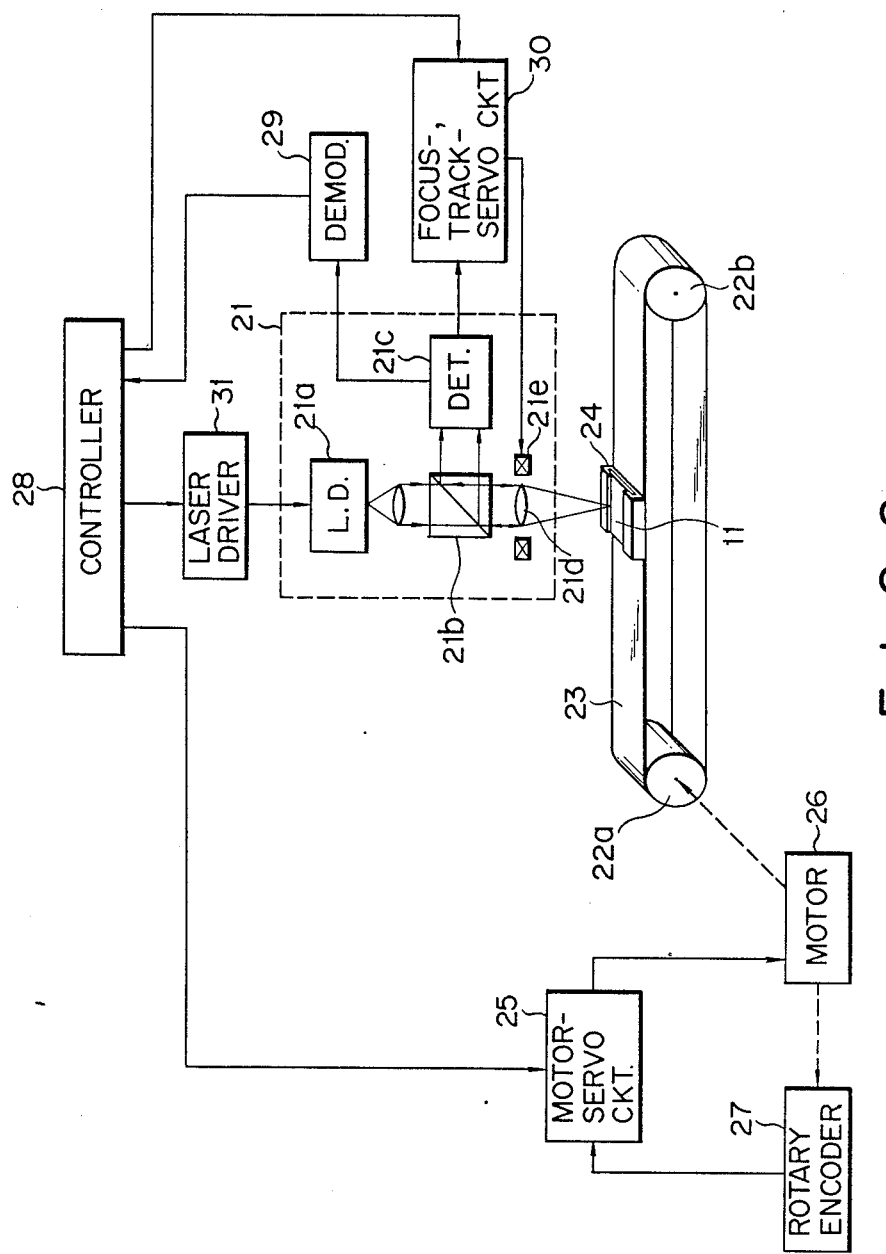
FIG. 2 is a block diagram of a prior art optical card recording/reproducing apparatus.

An optical card recording/reproducing apparatus according to one embodiment of this invention will be explained below referring to the accompanying drawings. Since this embodiment has the same general arrangement as that of the conventional apparatus shown in FIG. 2, the arrangement of this embodiment will thus be omitted from the explanation. This embodiment is characterized in its motor-servo circuit shown in a block diagram of FIG. 4. The numerals designating the components in FIG. 4 are the same as those number which designate corresponding or identical components shown in fIG. 3, thus, the detailed explanation thereof is omitted.

Figure 3:
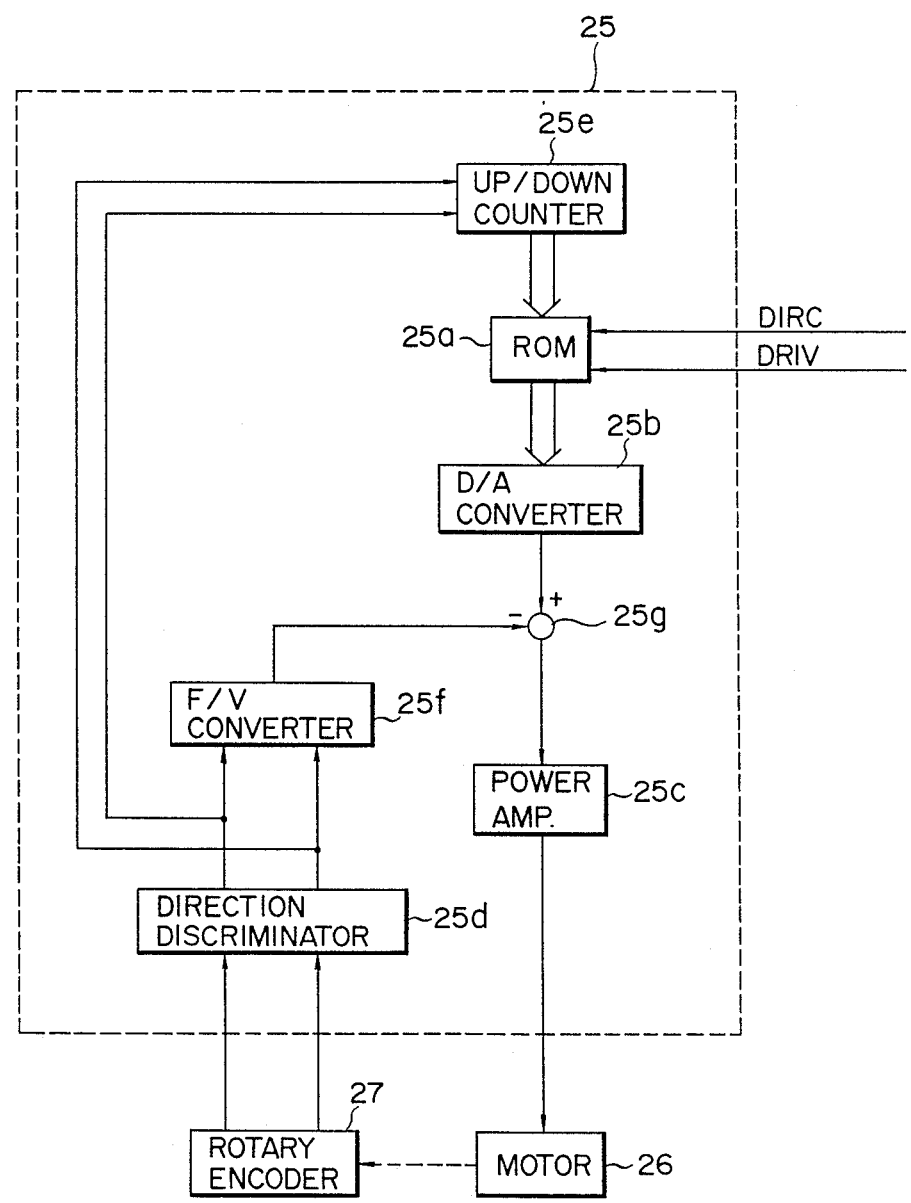
FIG. 3 is a detailed block diagram of a motor-servo circuit shown in FIG. 2.
Figure 4:
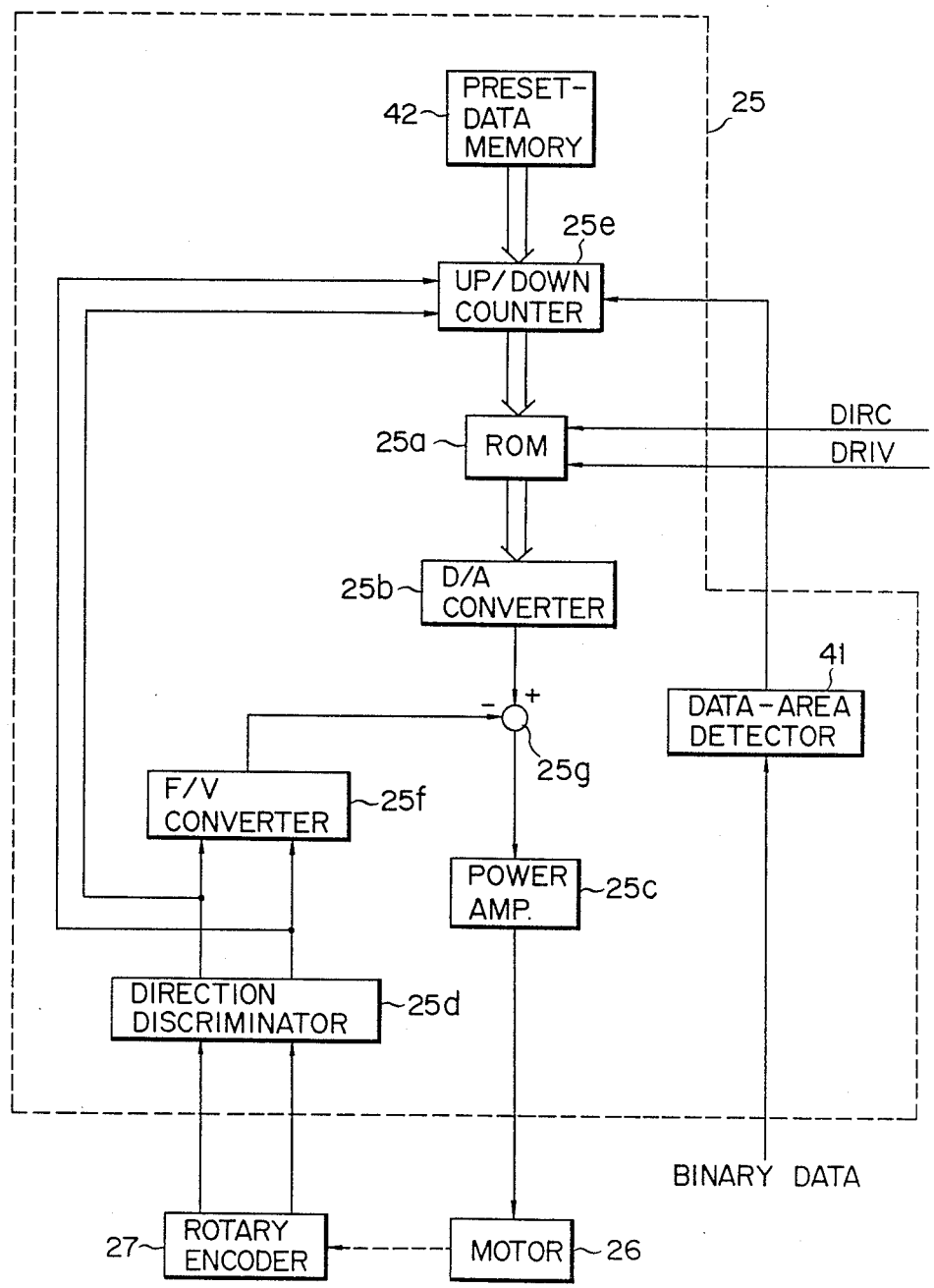
FIG. 4 is a detailed block diagram of a motor-servo circuit used in an optical card recording/reproducing apparatus according to one embodiment of this invention.

Motor-servo circuit 25 of this embodiment only differs from the one shown in FIG. 3 in that it is further provided with a data-area detector 41 and a preset-data memory 42.

Preset-data memory 42 sotes an address data of ROM 25a corresponding to the position of the head of identifier section 14a or 14b measured from the initial position. The present data corresponds to the length necessary for accelerating the shuttle to the desired speed.

Binary data corresponding to the reflection light of optical card 11 is supplied from controller 28 (FIG. 2) to data-area detector 41, which in turn determines from which section within the laser-beam irradiated region of optical card 11 the light is reflected: ID section 14a, ID section 14b, or data section 15. Upon detecting which one of the sections 14a, 14b, or 15 of the beam irradiated region the light is reflected from, data-area detector 41 sends its detection signal to a preset terminal of up/-down counter 25e. In response to the leading edge of the detection signal, up/down counter 25e fetches the data of preset-data memory 42 as a preset value.

Accordingly, even if card 11 is erroneously loaded in shuttle 24 or the position of ID sections 14a, 14b in card 11 are shifted in manufacturing, the count value of up/-down counter 25e will be corrected at the time the data area is detected, thus representing the accurate position of optical card 11 with respect to the light beam. Controlling motor 26, based on the data read out from ROM 25a in accordance with the count value, may permit ID section 14a data section 15 and ID section 14b of optical card 11 to pass the irradiation point of the laser beam from optical head 21 at an accurate constant speed. Thus, it is not necessary that the card access time be lengthened and the recording/reproducing speed be reduced.

FIG. 5 gives a detailed illustration of data-area detector 41. This detector 41 mainly comprises re-triggerable one-shot multivibrators 51 and 52 and a NAND gate 53. The binary data from controller 28 is supplied to an input terminal B of multivibrator 51, and the Q output of multivibrator 51 is supplied to an input terminal B of multivibrator 52. The Q output of multi-vibrator 51 and the $\overline{QQ}$ output of multivibrator 52 are supplied through NAND gate 53 to up/down counter 25e. Here, the Q output of multivibrator 51 is supplied to NAND gate 53 through an integration circuit constituted by a resistor R2 and a capacitor C2. For example, 74LS123, products of Texas Instruments, may serve as these multivibrators 51 and 52.

Multivibrators 51 and 52 are each externally coupled with a resistor and a capacitor for setting their time constants. These multivibrators 51 and 52 use the same capacitor C1 but use different resistors; R1 for the former multivibrator 51 and 8R1 for the latter whose resistance is eight times greater than that of R1. The time constant determined by C1 and R1 is set to correspond to time tw which is slightly greater than the data period of one binary data bit.

Multivibrator 51 outputs a single pulse (positive pulse) with a pulse width tw from the output terminal Q when the level at its input terminal B changes to "1" from a "0" level, and multivibrator 52 outputs a single pulse (negative pulse) with a pulse width 8tw from the inverted output terminal $\overline{QQ}$ when the level at its input terminal B changes to "1" from a "0" level.

With reference to the timing charts shown in FIGS. 6A to 6E, the operation of this embodiment will now be described. When drive direction signal DIRC and drive signal DRIV from controller 28 are supplied to ROM 25a, data is read out from ROM 25a at the address corresponding to the initial position of the shuttle and motor 26 is driven. This causes shuttle 24 to be set in an accelerated motion.

When ID section 14a or 14b of optical card 11 comes to a point whereat the laser beam from optical head 21 is irradiated, data area detector 41 detects the head of ID section 14a or 14b based on a readout signal (binary data). According to this embodiment, to prevent erroneous detection of the ID section due to reading a signal generated by dust or the like, the detected area is not considered to be holding data therein unless more than one byte of sequential data is output therefrom.

Figures 6A, 6B, 6C, 6D, 6E:
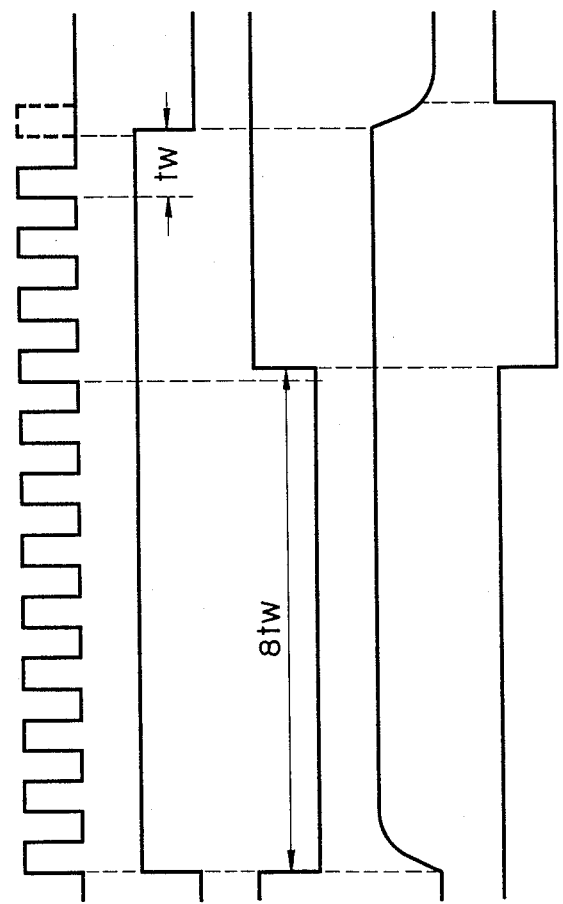
FIGS. 6A to 6E are timing charts illustrating the operation of the embodiment of the present invention.

When binary data as shown in FIG. 6A is supplied to multivibrator 51, the Q output of multivibrator 51 is set at a "1" level (see FIG. 6B) to be in synchronous with the rising of the first pulse. So as to be in synchronism with the rising of the $\overline{QQ}$ output of multivibrator 51, the inverted Q output of multivibrator 52 shifts to a "0" level as shown in FIG. 6C.

When multivibrator 51 receives more than one byte (8 bits) of input data in succession, it remains in a triggered state so that the Q output remains at a "1" level. However, the inverted $\overline{QQ}$ output of multivibrator 52 returns to a "1" level from a "0" level after time 8tw has elapsed, as shown in FIG. 6C.

The output of the integration circuit to which the Q output of multivibrator 51 shown in FIG. 6B becomes "1" level with a slight delay after the Q output of multivibrator 51 becomes "1" level, as shown in FIG. 6D.

When the inverted $\overline{QQ}$ output of multivibrator 52 as shown in FIG. 6C becomes "1" level, i.e., at time 8tw after the rising of the first pulse of the binary data, the output of NAND gate 53 changes from "1" level to "0" level as shown in FIG. 6E to become a data-area detection signal.

When no more binary data is received, multivibrator 51 has its Q output changed to "0" level from "1" level at time tw after the rising of the last pulse, as shown in FIG. 6A. As shown in FIG. 6D, the output of the integration circuit becomes "0" level with a slight delay from the occurrence of the above event, so that the output of NAND gate 53 becomes "1" level as shown in FIG. 6E, thus stopping the generation of the data-area detection signal.

As should be obvious from the above, the Q output of multivibrator 52 is not changed to "1" level from "0" level unless more than one byte of continuous binary data appears. Without detection of more than one byte of continuous binary data, therefore, the data area is not detected, thus preventing erroneous detection of the data area even if binary data is singly outputted due to detection of dust or the like.

As has been explained above, according to this embodiment, the positional relationship of the data area of an optical card with respect to the optical head can be detected and the data-readout address in ROM 25a, which controls motor speed 26 can be compensated according to the detected relationship. Even if the position of the optical card loaded in the shuttle is deviated or the data area of the card is shifted during manufacturing, data can be recorded/reproduced accurately and at a high speed.

The data area may be detected by recording a pattern different from an address in advance in ID sections 14a and 14b and detecting the pattern. In this case, the data stored in the preset memory should represent the recording position of the pattern. The amount of rotation of the motor may be detected by a linear encoder instead of a rotary encoder. In addition, the ID sections need not be provided at both end portions of an optical card, and the optical head may be moved instead of the shuttle along the tracks on the optical card.

What is claimed is:

1. An optical card recording/reproducing apparatus comprising:
   a holding section for receiving an optical card;
   an optical head for emitting a light beam;
   moving means which is drivable for moving said holding section and said optical head relative to each other to thereby scan a data area of an optical card received in said holding section with the light beam;
   detection means for detecting a positional relationship between the data area of said optical card and said holding section; and
   control means for controlling driving of said moving means based on a detection result attained by said detection means to thereby control a relative moving speed of said holding section and said optical head based on said detection result.

2. An apparatus according to claim 1, wherein said detection means includes means for detecting a data area of said optical card.

3. An apparatus according to claim 1, wherein said detection means includes means for detecting a predetermined data pattern recorded on said optical card.

4. An apparatus according to claim 1, wherein said control means comprises:
   counter means for indicating a positional relationship between said holding section and said optical head;
   means for correcting a count of said counter means responsive to a detection by said detection means;
   memory means for storing speed data corresponding to individual relative positions of said holding section and said optical head, said memory means having a readout address determined by the count of said counter means; and
   driving means for driving said moving means at a speed corresponding to data readout of said memory means.

5. An optical card recording/reproducing apparatus comprising:
   an optical card having a number of parallel tracks arranged on a surface thereof, each of said tracks having a center portion serving as a data area;
   card holding means for holding said optical card;
   an optical head for irradiating a laser beam onto said optical card;
   moving means for moving said card holding means and said optical head relative to each other to scan said tracks of said optical card with said laser beam; and
   control means for detecting a positional relationship between the data areas of said optical card held by said card holding means and said optical head, and for controlling a moving speed of said moving means in accordance with said detected positional relationship such that a relative moving speed of said data areas of said tracks with respect to said laser beam is constant.

6. An apparatus according to claim 5, wherein said control means comprises:
   memory means for storing speed data for each relative position of said card holding means with respect to said optical head;
   first detection means for detecting a relative position of said card holding means with respect to said optical head;
   second detection means for detecting a relative position of said holding means with respect to the data areas of said optical card and for compensating for an output of said first detection means in accordance with a compensation result which is based on a detection result of said second detection means; and
   means for reading out data from said memory means in accordance with said compensation result.

7. An apparatus according to claim 5, wherein said control means comprises:
   memory means for storing speed data for each relative position of said card holding means with respect to said optical head;
   first detection means for detecting a relative position of said card holding means with respect to said optical head;
   counter means responsive to said first detection means for producing a count value which is increased or decreased in accordance with an output of said first detection means;
   second detection means for detecting that said data area of a track of said optical card has reached a point whereat said laser beam is irradiated; and
   preset means for presetting predetermined data representing the position of the data areas in said counter means when said second detection means detects that said data area of said optical card has reached said point whereat said laser beam is irradiated.

* * * * *